(12) United States Patent
Speronello et al.

(10) Patent No.: US 9,340,756 B2
(45) Date of Patent: *May 17, 2016

(54) CHLORINE DIOXIDE BASED CLEANSER/SANITIZER

(71) Applicant: BASF Corporation, Florham Park, NJ (US)

(72) Inventors: Barry Keven Speronello, Montgomery Township, NJ (US); Frank Sebastian Castellano, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,331

(22) Filed: Feb. 27, 2014

(65) Prior Publication Data

US 2014/0178359 A1    Jun. 26, 2014

Related U.S. Application Data

(63) Continuation of application No. 11/364,527, filed on Feb. 28, 2006, now Pat. No. 8,673,297.

(51) Int. Cl.

| C11D 3/48 | (2006.01) |
|---|---|
| C11D 3/06 | (2006.01) |
| C01B 11/02 | (2006.01) |
| C11D 3/04 | (2006.01) |
| C11D 3/20 | (2006.01) |
| C11D 3/36 | (2006.01) |
| C11D 11/00 | (2006.01) |

(52) U.S. Cl.
CPC ............... *C11D 3/48* (2013.01); *C01B 11/024* (2013.01); *C11D 3/042* (2013.01); *C11D 3/046* (2013.01); *C11D 3/06* (2013.01); *C11D 3/2086* (2013.01); *C11D 3/362* (2013.01); *C11D 11/0029* (2013.01)

(58) Field of Classification Search
CPC ...... C11D 3/48; C11D 11/0029; C11D 3/043; C11D 4/046; C11D 3/06; C11D 3/2086; C01B 11/024

See application file for complete search history.

(56) References Cited

U.S. PATENT DOCUMENTS

| 2,022,262 A | 11/1935 | White |
|---|---|---|
| 2,071,094 A | 2/1937 | Vincent |
| 2,482,891 A | 9/1949 | Royden |
| 4,044,103 A | 8/1977 | Mollard et al. |
| 4,086,328 A | 4/1978 | Swindells |
| 4,104,024 A | 8/1978 | Vogele |
| 4,104,190 A | 8/1978 | Hartshorn |
| 4,310,425 A | 1/1982 | Key et al. |
| 4,473,115 A | 9/1984 | Oakes |
| 4,547,381 A | 10/1985 | Mason et al. |
| 4,585,482 A | 4/1986 | Tice et al. |
| 4,689,169 A | 8/1987 | Mason et al. |
| 4,731,193 A | 3/1988 | Mason et al. |
| 4,889,654 A | 12/1989 | Mason et al. |
| 4,994,195 A | 2/1991 | Edmondson et al. |
| 4,995,987 A | 2/1991 | Whitekettle et al. |
| 4,997,626 A | 3/1991 | Dziabo et al. |
| 5,009,875 A | 4/1991 | Kelley et al. |
| 5,076,960 A | 12/1991 | Hutchings et al. |
| 5,077,008 A | 12/1991 | Kralovic et al. |
| 5,078,908 A | 1/1992 | Ripley et al. |
| 5,152,929 A | 10/1992 | Bentley et al. |
| 5,204,081 A | 4/1993 | Mason et al. |
| 5,246,662 A | 9/1993 | Ripley et al. |
| 5,279,673 A | 1/1994 | Dziabo |
| 5,281,353 A | 1/1994 | Park et al. |
| 5,306,440 A | 4/1994 | Ripley et al. |
| 5,330,752 A | 7/1994 | Park et al. |
| 5,332,531 A | 7/1994 | Horwitz et al. |
| 5,348,734 A | 9/1994 | Ratcliff |
| 5,489,435 A | 2/1996 | Ratcliff |
| 5,523,072 A | 6/1996 | Falgen et al. |
| 5,618,550 A | 4/1997 | Ratcliff |
| 5,631,300 A | 5/1997 | Wellinghoff et al. |
| 5,639,295 A | 6/1997 | Wellinghoff et al. |
| 5,650,446 A | 7/1997 | Wellinghoff et al. |
| 5,668,185 A | 9/1997 | Wellinghoff et al. |
| 5,678,242 A | 10/1997 | Horwitz et al. |
| 5,695,814 A | 12/1997 | Wellinghoff et al. |
| 5,705,092 A | 1/1998 | Wellinghoff et al. |

(Continued)

FOREIGN PATENT DOCUMENTS

| CN | 1293540 A | 5/2001 |
|---|---|---|
| CN | 1444852 A | 10/2003 |

(Continued)

OTHER PUBLICATIONS

Bohner et al. (1991) "Corrosivity of Chlorine Dioxide Used as Sanitizer in Ultrafiltration Systems" J. Dairy Sci. 74:3348-3352.

Jimenez-Villarreal et al. (2003) "The effects of multiple antimicrobial interventions on processing, lipid, textural, instrumental color and sensory characteristics when used in a ground beef patty production system" Meat Science 65 1021-1029.

International Search Report dated Aug. 16, 2007 for PCT/US2007/004288.

International Preliminary Report on Patentability dated Sep. 2, 2008 for PCT/US2007/004288.

Office Action dated Nov. 17, 2009 in U.S. Appl. No. 11/425,561, filed Jun. 21, 2006.

(Continued)

*Primary Examiner* — Abigail Fisher
(74) *Attorney, Agent, or Firm* — Drinker Biddle & Reath LLP (57) ABSTRACT

This invention relates to an improved chlorine dioxide solution or liquid mixture containing a phosphate and, as well, as to a composition for forming the chlorine dioxide and phosphate liquid mixture. This improved chlorine dioxide solution is used to clean and/or sanitize without causing corrosion. The corrosion nature of the chlorine dioxide solution is lessened due to the addition of phosphate to the composition.

20 Claims, 1 Drawing Sheet

(56) References Cited

U.S. PATENT DOCUMENTS

| | | | |
|---|---|---|---|
| 5,707,739 A | 1/1998 | Wellinghoff et al. | |
| 5,785,934 A | 7/1998 | Jacobs et al. | |
| 5,811,115 A | 9/1998 | Ratcliff | |
| 5,834,003 A | 11/1998 | Ratcliff | |
| 5,888,528 A | 3/1999 | Wellinghoff et al. | |
| 5,902,575 A | 5/1999 | Ratcliff | |
| 5,914,120 A | 6/1999 | Wellinghoff et al. | |
| 5,935,592 A | 8/1999 | Ratcliff | |
| 5,965,264 A | 10/1999 | Barenberg et al. | |
| 5,974,810 A | 11/1999 | Speronello | |
| 6,007,772 A | 12/1999 | Green | |
| 6,017,554 A | 1/2000 | Ratcliff | |
| 6,046,243 A | 4/2000 | Wellinghoff et al. | |
| 6,077,495 A | 6/2000 | Speronello et al. | |
| 6,114,398 A | 9/2000 | Ratcliff | |
| 6,171,485 B1 | 1/2001 | Kuke | |
| 6,178,922 B1 | 1/2001 | Denesuk et al. | |
| 6,196,156 B1 | 3/2001 | Denesuk et al. | |
| 6,200,557 B1 | 3/2001 | Ratcliff | |
| 6,203,688 B1 | 3/2001 | Lipsztajn et al. | |
| 6,210,078 B1 | 4/2001 | Redwine | |
| 6,231,830 B1 | 5/2001 | Madray | |
| 6,238,643 B1 | 5/2001 | Thangaraj et al. | |
| 6,240,879 B1 | 6/2001 | Denesuk et al. | |
| 6,274,132 B1 | 8/2001 | Ratcliff | |
| 6,277,363 B1 | 8/2001 | Ratcliff | |
| 6,287,551 B1 | 9/2001 | Ratcliff | |
| 6,294,108 B1 | 9/2001 | Speronello et al. | |
| 6,306,281 B1 | 10/2001 | Kelley | |
| 6,379,643 B1 | 4/2002 | Klatte | |
| 6,428,696 B2 | 8/2002 | Kuke | |
| 6,432,322 B1 | 8/2002 | Speronello et al. | |
| 6,534,075 B1 | 3/2003 | Hei et al. | |
| 6,572,789 B1 | 6/2003 | Yang et al. | |
| 6,582,682 B2 | 6/2003 | Stier | |
| 6,585,933 B1 | 7/2003 | Ehrhardt et al. | |
| 6,596,246 B2 | 7/2003 | Huato et al. | |
| 6,605,304 B1 | 8/2003 | Wellinghoff et al. | |
| 6,669,931 B2 | 12/2003 | Lynch et al. | |
| 6,699,404 B2 | 3/2004 | Speronello et al. | |
| 6,723,304 B2 | 4/2004 | Stier | |
| 6,743,574 B1 | 6/2004 | Wolfinbarger, Jr. et al. | |
| 6,764,661 B1 | 7/2004 | Girard | |
| 6,770,264 B2 | 8/2004 | Stier et al. | |
| 6,881,320 B1 | 4/2005 | Krafton et al. | |
| 7,182,883 B2 | 2/2007 | Speronello et al. | |
| 8,088,300 B2 | 1/2012 | Byrne et al. | |
| 8,673,297 B2 * | 3/2014 | Speronello et al. | 424/126 |
| 2002/0058006 A1 | 5/2002 | Klatte | |
| 2003/0129144 A1 | 7/2003 | Scott et al. | |
| 2004/0135116 A1 | 7/2004 | Speronello et al. | |
| 2005/0196370 A1 | 9/2005 | Yu et al. | |
| 2005/0249658 A1 | 11/2005 | Tarbet | |
| 2006/0039840 A1 | 2/2006 | Chia et al. | |
| 2006/0169949 A1 | 8/2006 | Speronello et al. | |
| 2006/0197057 A1 | 9/2006 | Martin | |
| 2007/0172412 A1 | 7/2007 | Hratko et al. | |
| 2007/0264226 A1 | 11/2007 | Karagoezian et al. | |
| 2007/0295936 A1 | 12/2007 | Byrne et al. | |
| 2008/0031805 A1 | 2/2008 | Bergmann et al. | |

FOREIGN PATENT DOCUMENTS

| | | |
|---|---|---|
| GB | 608069 A | 9/1948 |
| GB | 2355197 | 4/2001 |
| GB | 2426708 | 5/2005 |
| JP | 2003135041 | 5/2003 |
| KR | 1019970000300 | 1/1997 |
| WO | 2004103898 | 12/2004 |
| WO | 2006000756 | 1/2006 |

OTHER PUBLICATIONS

Office Action dated Jun. 1, 2010 in U.S. Appl. No. 11/425,561, filed Jun. 21, 2006.
Office Action dated Sep. 28, 2010 in U.S. Appl. No. 11/425,561, filed Jun. 21, 2006.
Office Action dated Apr. 14, 2011 in U.S. Appl. No. 11/425,561, filed Jun. 21, 2006.
Advisory Action dated Jul. 1, 2011 in U.S. Appl. No. 11/425,561, filed Jun. 21, 2006.
Notice of Allowance dated Oct. 5, 2011 in U.S. Appl. No. 11/425,561, filed Jun. 21, 2006.

* cited by examiner

CHLORINE DIOXIDE BASED CLEANSER/SANITIZER

CROSS-REFERENCE TO RELATED APPLICATIONS

This application is a continuation of U.S. application Ser. No. 11/364,527, filed Feb. 28, 2006. The entire disclosure of the aforesaid application is incorporated herein in its entirety by reference.

FIELD OF THE INVENTION

This invention relates to chlorine dioxide compositions. In particular, the invention relates to a novel liquid chlorine dioxide mixture for cleaning and sanitizing.

BACKGROUND OF THE INVENTION

Chlorine dioxide in low concentrations (i.e. up to 1,000 ppm) has long been recognized as useful for the treatment of odors and microbes, see U.S. Pat. No. 6,238,643. Its use is particularly advantageous where microbes and/or organic odorants are sought to be controlled on and around foodstuffs, as chlorine dioxide functions without the formation of undesirable side products such as chloramines or chlorinated organic compounds that can be produced when elemental chlorine is utilized for the same or similar purposes.

Unfortunately, chlorine dioxide can be explosive at concentrations above about 0.1 atmosphere. Therefore, chlorine dioxide gas is not manufactured and shipped under pressure like other industrial gases, and conventional methods of on-site manufacture require not only expensive generation equipment but also high levels of operator skill to avoid generating dangerously high concentrations. These problems have substantially limited the use of chlorine dioxide to large commercial applications, such as pulp and paper bleaching, water treatment, and poultry processing, where the consumption of chlorine dioxide is sufficiently large to justify the capital and operating costs of expensive equipment and skilled operators for on-site manufacture.

Commercially, chlorine dioxide is produced from a variety of aqueous solutions of certain chlorine-containing salts, as disclosed for example in U.S. Pat. No. 5,009,875.

Attempts have also been made to produce chlorine dioxide using mixtures of solid reagents. Generally, the prior art has focused on three systems for chlorine dioxide production using solid reagents. One system employs a solid mixture of a metal chlorite and an acid in a liquid, aqueous environment. A second system combines a metal chlorite and a solid acid where chlorine dioxide gas is released under dry conditions. A third system employs the combination of a metal chlorite and a solid organic anhydride to generate a highly concentrated flow of chlorine dioxide which must be diluted with a constantly flowing stream of inert gas.

Aqueous solutions of chlorine dioxide are also known in the art. Two types of synthesis processes are generally used to provide chlorine dioxide solutions for commercial uses, such as poultry chiller water purification, wash-water purification, potable water treatment and as a teat dip for the control of non-human mammalian mastitis.

The first type of synthesis process is based on the manual combination of two aqueous solutions; one containing a source of chlorite anions and another being acidic. The solution containing chlorite anions is usually a solution of sodium chlorite having a concentration of between about 100 ppm and about 5% by weight and having a pH of about 13. The acidic solution may contain any acid capable of providing a pH below about 8.5 after the solutions are mixed. Such acids include citric acid, lactic acid, hydrochloric acid, sulfuric acid, and dissolved carbon dioxide (i.e., sodium bicarbonate). The antimicrobial performance of the resultant solutions depends upon the degree to which the chlorite anions from the chlorite source solution are converted to free molecular chlorine dioxide ("Chlorine Dioxide") in the solution, as chlorine dioxide is the effective agent for both antimicrobial and deodorization activity.

In one variation on this synthesis process, the pH of the sodium chlorite solution is reduced from about 13 to about 8 using the acidic solution. Chlorite anion is thus converted to chlorine dioxide via the reaction below.

$$5ClO_2^- + 5H^+ \leftrightarrow 4ClO_2 + HCl + 2H_2O$$

Such solutions having a pH of about 8 are generally referred to in the industry as "stabilized" chlorine dioxide solutions, and usually contain between about 100 ppm and 5% of a mixed solution of chlorine dioxide and unconverted chlorite anion. Because the acid concentration is relatively low at a pH of 8, the typical ratio of chlorine dioxide to chlorite anion in a stabilized chlorine dioxide solution is less than 0.01. Therefore, for a given initial concentration of chlorite anion, stabilized chlorine dioxide solutions are relatively weak antimicrobial agents due to their low conversion of chlorite anion to chlorine dioxide. Also, since the stabilized chlorine dioxide solutions are typically supplied at a concentration of less than about 5% by weight sodium chlorite, shipping and storage of the solution is relatively expensive due to the high weight of water that must be transported with the sodium chlorite.

Chlorite anion is generally stable in stabilized solutions (pH 8) and thus has an advantageously long shelf life. However, the chlorite anions are typically activated just prior to use to improve effectiveness. This is accomplished by the addition of a strong acid to lower the pH to below about 3.5 and convert more chlorite anion to chlorine dioxide via the reaction shown above. Since the activation process involves the addition of a strong acid to lower the pH, a high level of operator skill is required to handle, measure and mix the acid with the stabilized chlorine dioxide solution. Also, since the activation process results in a solution having a pH of less than about 3.5, such activated solutions are not well suited to work in combination with, for example, detergents which work best under alkaline or neutral pH conditions. Contact of these solutions with many metals should also be limited because of possible metallic corrosion by the acidic solution.

Such activated solutions typically have a ratio of chlorine dioxide to chlorite anion below about 0.05 when the solution is acidified to a pH of about 3. A higher ratio of chlorine dioxide to chlorite anion can be achieved in such activated solutions, but doing so is dangerous and requires extreme operator skill. Achieving a ratio of chlorine dioxide to chlorite anion above about 0.05 requires further acidification to a much lower pH than 3 (typically less than 2) and often requires that the further acidification be performed at concentrations of chlorite anion above about 5000 ppm. Under such conditions of extremely low pH and high chlorite ion concentration a sufficient chlorine dioxide concentration can be generated in such solutions such that the vapor pressure of gaseous chlorine dioxide in equilibrium with the solution approaches the explosive range. Therefore, manual acidification (i.e. without chlorine dioxide generation equipment as discussed below) is not commonly employed in producing solutions having a high ratio of chlorine dioxide to chlorite anion.

In the second type of chlorine dioxide solution synthesis process, chlorine dioxide solution is generated from either a sodium chlorite solution or stabilized chlorine dioxide solution using chlorine dioxide generation equipment at the point of use. The generated solution typically has a ratio of chlorine dioxide to chlorite anion of between about 10 and 25, and as a result such solutions are highly effective antimicrobial agents. Since generated chlorine dioxide solution is typically used shortly after generation, the relatively high decomposition rate of chlorine dioxide in solution is unimportant. Also, since aqueous sodium chlorite is commercially available at higher concentrations than are typically available in the form of stabilized chlorine dioxide solutions, the cost of storing and shipping the aqueous sodium chlorite solutions can be lower when compared to stabilized chlorine dioxide solution. However, the high cost of the chlorine dioxide generation equipment and the high level of operator skill needed for its operation make generated chlorine dioxide solution best suited to relatively large applications such as water treatment and poultry processing where the consumption of chlorine dioxide is sufficiently large thereby justifying the such high capital and operating costs.

In addition to the two types of commercial synthesis processes for chlorine dioxide solution discussed above, solutions containing chlorine dioxide and having a high ratio of chlorine dioxide to chlorite anion can be generated by absorption of gaseous chlorine dioxide into water. Chlorine dioxide is first produced in solution by conventional means, e.g. acid activation of a solution of sodium chlorite. Inert carrier gas, typically air or nitrogen is then bubbled through the activated solution picking up some of the chlorine dioxide. That gaseous mixture of chlorine dioxide and carrier gas is then bubbled through a second vessel containing water where the chlorine dioxide is dissolved to produce a solution of chlorine dioxide typically having a ratio of chlorine dioxide to chlorite anion of about 20 or higher. While it is possible to produce substantially pure solutions of chlorine dioxide in this manner, it requires a very high level of operator skill and is rarely done outside of the laboratory.

Attempts have been made to reduce the cost of generating chlorine dioxide solutions by using mixtures of alkaline chlorite salts and acidic dry powders which, upon addition to water, acidify the water and generate chlorine dioxide via reaction described above. U.S. Pat. No. 2,022,262, discloses stable stain removing compositions comprising a dry mixture of a water soluble alkaline chlorite salt, an oxalate, and an acid. Since alkaline chlorites are strong oxidizers and corrosively caustic, a relatively high level of user skill is needed to employ this process.

U.S. Pat. No. 2,071,094 discloses deodorizing compositions in the form of dry briquettes comprising a dry mixture of a soluble chlorite, an acidifying agent, and a filler of lower solubility. Generation of chlorine dioxide begins as the briquette dissolves in water. This process is suitable for unskilled users, but still requires that the resultant solution be produced at an acidic pH.

U.S. Pat. No. 2,482,891 discloses stable, solid, substantially anhydrous compositions comprising alkaline chlorite salts and organic acid anhydrides which release chlorine dioxide when contacted with water. The patent disclosure indicates that the preferred solution is highly concentrated and consequently would have been at an acidic pH. As such, this process suffers from the same limitations as the '262 and '091 patents mentioned above.

U.S. Pat. No. 4,585,482 discloses a long-acting biocidal composition comprising a chlorine dioxide liberating compound and a hydrolyzable organic acid-generating polymer. Methods are disclosed for producing dry polymer encapsulated microcapsules containing such compositions and water such that the resultant dry materials release chlorine dioxide gas. The primary purpose of the polymer encapsulating film of the '482 patent is to provide for hard, free flowing particles, and to protect against the loss of water from the interior of the microcapsule. Immersing the microcapsules in water would produce a chlorine dioxide solution. Producing chlorine dioxide solution in this manner would eliminate the complications of measuring and mixing reagents and the cost of capital equipment that characterize the prior art. In addition, the solution pH need not be acidic so it would be feasible to produce chlorine dioxide in a detergent solution. However, the materials of the '482 patent are not storage stable because chlorine dioxide is released soon after manufacturing. Furthermore, chlorine dioxide is released over a period of several days, so the materials of the '482 patent are unsuitable for quickly preparing a useable chlorine dioxide solution. Finally, once mixed in water the microcapsules cannot be removed from the water in a simple fashion. Typically the microcapsules must be separated by a process such as filtration.

The present assignee manufactures Aspetrol® chlorine dioxide generating tablets. The tablets are used in a wide array of applications such as to oxidize foul smelling compounds, deodorize areas, disinfect, etc. Assignee's patents directed to chlorine dioxide generating tablets include U.S. Pat. Nos. 6,699,404 and 6,432,322. These patents disclose solid bodies for preparing highly converted solutions of chlorine dioxide when added to water. The solid body comprises a metal chlorite such as sodium chlorite, an acid source such as sodium bisulfate and, optionally, a source of free halogen such as the sodium salt of dichloroisocyanuric acid or a hydrate thereof.

U.S. Pat. No. 6,238,643, also issued to the present assignee, discloses a method of producing an aqueous solution of chlorine dioxide from the reaction of chlorine dioxide generating components. The chlorine dioxide generating components are a metal chlorite and an acid forming component which do not react to produce chlorine dioxide in the substantial absence of water. The chlorine dioxide generating components are disposed in an enclosed space bounded at least in part by a membrane that is water and/or water vapor permeable but impermeable to the chlorine dioxide generating components contained therein. The membrane-bounded space containing the chlorine dioxide generating components is contacted with liquid water so the chlorine dioxide may generate and pass out through the membrane into the liquid water forming the aqueous solution of chlorine dioxide.

One problem with chlorine dioxide compositions, in particular, those formed with alkali metal chlorites and acid, whether solid or liquid, is that the resultant composition results in an acidic solution that is corrosive to metals. Thus, a chlorine dioxide solution is desired that will sanitize and cleanse especially metal objects without harming substrates on which it is being used. In accordance with the present invention, a chlorine dioxide solution is provided that inhibits metal corrosion.

SUMMARY OF THE INVENTION

This invention relates to an improved chlorine dioxide solution or liquid mixture containing a phosphate and, as well, to a composition for forming the chlorine dioxide and phosphate liquid mixture. This improved chlorine dioxide solution is used to clean and/or sanitize while inhibiting metal corrosion. The corrosive nature of the chlorine dioxide solution is lessened due to the addition of phosphate to the composition.

DETAILED DESCRIPTION OF THE INVENTION

The present invention is directed toward an improved cleaning and/or sanitizing chlorine dioxide liquid mixture or solution comprising a phosphate ("liquid mixture" or "solution") and to a composition for forming the improved chlorine dioxide liquid mixture comprising the phosphate ("forming composition"). The phosphate containing chlorine dioxide solution of the present invention is less corrosive (i.e., reduced corrosivity) relative to the chlorine dioxide solutions of the prior art. The prior art acidic chlorine dioxide solutions are recognized as being corrosive when used at high concentrations (>10 ppm), for long periods of time or when used repeatedly for shorter times. Here, the presence of the phosphate in the chlorine dioxide solution inhibits metal corrosion. In particular, the corrosiveness of the prior art solutions are corrosive when their pH is low.

The liquid mixture of the present invention comprising chlorine dioxide and phosphate is formed using any of several types of precursors such as liquid solutions, dry tablets (solid bodies), briquettes, granules, powders or combination thereof which when in liquid phase produces a mixture containing chlorine dioxide and phosphate anions. The resultant solution is capable of cleaning and/or sanitizing and, depending upon its pH, removing mineral scale while being less corrosive to metals than prior art solutions.

The pH of the liquid mixture can vary from very low (<2) to as high as about 12.5. Chlorine dioxide disproportionates to chlorite and chlorate anions above a pH of about 11, and at pH>12.5 the rate of disproportionation is too high to produce a practically useful chlorine dioxide solution. At pH below about 2, acidic corrosion can be an issue even when phosphate is present. When limescale removal is an important function of the liquid mixture, the pH is preferably about 2.5-3.5. For the minimum corrosivity of the liquid mixture the pH is preferably above 3.5, more preferably above 4, and most preferably above 4.5.

The pH of the liquid mixture may result from the inherent conditions of chlorine dioxide generation used to produce the liquid mixture, or it may be the result of pH adjustment after the generation of chlorine dioxide. For example, if the liquid mixture is produced by acidification of a sodium chlorite solution using phosphoric acid to a pH of about 2 (the low pH necessary to achieve substantial conversion of chlorite anion to chlorine dioxide), then alkali may be added to the pH 2 chlorine dioxide solution to increase its pH to >2.5. Examples of suitable alkaline materials are inorganic hydroxides, such as sodium hydroxide, magnesium hydroxide, potassium hydroxide, and calcium hydroxide; metal carbonates of strong bases, such as sodium carbonate, and potassium carbonate; and a variety of other materials known in the art to increase the pH of aqueous solutions. Preferred materials to increase the pH of an overly acidic liquid mixture comprising chlorine dioxide and phosphate anions are those which will buffer the pH at a preferred level between about 2.5 and <12.

For example, sodium acid carbonate ($NaHCO_3$) will buffer the pH of the liquid mixture at about 8. Sodium citrate will buffer the pH at about 4.5.

Alternatively, the pH of the liquid mixture comprising chlorine dioxide and phosphate may inherently be within the desired range after synthesis of the chlorine dioxide. For example, if solid bodies of the type disclosed in U.S. Pat. Nos. 6,699,404 and 6,432,322 are used to produce the chlorine dioxide, the pH of the resultant liquid mixture is typically within the preferred range upon synthesis. It is still within the scope of this invention, though, to further adjust the pH of such liquid mixtures to another pH within the preferred range by the addition of materials which will increase or decrease the pH of the mixture.

The chlorine dioxide forming composition comprising phosphate used to produce the liquid mixture may be composed of a metal chlorite, an acid source, an effective amount of phosphate used to reduce the corrosivity of the resultant liquid mixture, optionally a halogen, and optionally a surfactant. If the acid source is an acid phosphate, excess acid may be required to convert the metal chlorite to chlorine dioxide and provide the effective amounts of phosphate to inhibit corrosion. The liquid mixture can be produced by mixing aqueous solutions of the forming composition constituents or by mixing particulate forming composition ingredient(s) with water or aqueous solutions of the forming composition constituents. The liquid mixture will typically be in the form of a solution, but may also encompass suspensions, emulsions and other undissolved phases such as an emulsion of chlorine dioxide/phosphate solution in a light hydrocarbon liquid.

The aqueous solution(s) of the forming composition may include an aqueous metal chlorite solution, an aqueous acid source, an aqueous phosphate solution, water alone, water with additional ingredients including organic solvents such as hydrocarbons, lower alcohols, aldehydes, ketones, etc. The particulate forming composition ingredients used for forming the liquid mixture include particulate metal chlorite, particulate acid, and particulate phosphate. In a preferred method of forming the liquid mixture, the particulate forming composition ingredients used to produce the liquid mixture will be disposed in a solid body. The solid body will comprise particulate forming composition ingredients such as particulate metal chlorite, particulate acid, and optionally particulate phosphate. The resultant liquid mixture will be acidic having a pH of preferably below about 4 to convert chlorite anion to chlorine dioxide and to provide for the removal of mineral scale when used as a cleaner/sanitizer. Regardless of how the liquid mixture is made, it is desirable to minimize the concentration of chloride anion in the solution to improve its compatibility with metallic surfaces, particularly ferrous metal surfaces.

The metal chlorite employed in the present invention can generally be any metal chlorite. Preferred metal chlorites are alkali metal chlorites, such as sodium chlorite and potassium chlorite. Alkaline earth metal chlorites can also be employed. Examples of alkaline earth metal chlorites include barium chlorite, calcium chlorite, and magnesium chlorite. The most preferred metal chlorite used herein is sodium chlorite. In some cases, a metal chlorate may be used instead of a metal chlorite.

The acid source may include inorganic acid salts, salts comprising the anions of strong acids and cations of weak bases, such as aluminum chloride, aluminum nitrate, cerium nitrate, and iron sulfate. Acids that can liberate protons into solution when contacted with water, for example, a mixture of the acid ion exchanged form of molecular sieve ETS-10 (see U.S. Pat. No. 4,853,202) and sodium chloride; organic acids, such as citric acid and tartaric acid; and mixtures thereof. The acid source, in particular applications of the present invention, is preferably a particulate solid material which does not react substantially with the metal chlorite during dry storage, however, does react with the metal chlorite to form chlorine dioxide when in the presence of the aqueous solution. As used herein the term "acid source" shall generally mean a particulate solid material which is itself acidic or produces an acidic environment when in contact with liquid and metal chlorite. The acid source may be water soluble or substantially insoluble in water. The preferred acid sources are those which produce a pH of below about 4, more preferably below about 3.

Examples of preferred substantially water soluble acid sources include, but are not limited to, water soluble solid acids such as boric acid, citric acid, tartaric acid, water soluble organic acid anhydrides such as maleic anhydride, and water soluble acid salts such as calcium chloride, magnesium chloride, magnesium nitrate, lithium chloride, magnesium sulfate, aluminum sulfate, sodium acid sulfate ($NaHSO_4$), sodium dihydrogen phosphate ($NaH_2PO_4$), potassium acid sulfate ($KHSO_4$), potassium dihydrogen phosphate ($KH_2PO_4$), and mixtures thereof. The most preferred acid source is sodium acid sulfate (sodium bisulfate). Additional water soluble acid sources will be known to those skilled in the art and are included within the scope of the present invention.

The phosphate employed in the present invention may comprise phosphate anions ($PO_4^{-3}$); complex phosphate anions including pyrophosphates ($P_2O_7^{-4}$), polyphosphates, and the like; or organic phosphates such as organic esters. Examples of phosphates used herein include phosphoric acid ($H_3PO_4$), a strong acid; tetrasodium pyrophosphate ($Na_4O_7P_2$); trisodium phosphate ($Na_3PO_4$), which is a strong base; and sodium dihydrogen phosphate ($NaH_2PO_4$) a weak acid. Sodium dihydrogen phosphate ($NaH_2PO_4$) is the preferred phosphate. If an acid phosphate is used as the acid source, then excess acid is required to convert the metal chlorite into chlorine dioxide and as well as to provide an effective corrosion-inhibiting amount of phosphate in the mixture. Generally, regardless of the pH of the phosphate used, an acid source will be employed along with the phosphate to make the present solution.

Suitable examples of the free halogen source used in the solid bodies include dichloroisocyanuric acid and salts thereof such as sodium dichloroisocyanurate and/or the dihydrate thereof (alternatively referred to as the sodium salt of dichloroisocyanuric acid and/or the dihydrate thereof and hereinafter collectively referred to as "NaDCCA"), trichlorocyanuric acid, salts of hypochlorous acid such as sodium, potassium and calcium hypochlorite, bromochlorodimethylhydantoin, dibromodimethylhydantoin and the like. The preferred source of the free halogen is NaDCCA.

Suitable surfactant components may be cationic, anionic, and non-ionic. Possible anionic surfactants may be soaps such as sodium oleate (NaOA), fatty acid salts, sodium dodecyl sulfate (SDS), other alkyl sulfate salts, and alkylbenzene sulfonates (ABS). Possible cationic surfactants may include cetyl trimethylammonium bromide (CTAB) and other alkyl-trimethylammonium salts, cetyl pyridinium chloride, polyethoxylated tallow amine, alkyl amine salts and quaternary ammonium salts such as alkyl dimethyl benzyl ammonium chloride. Examples of non-ionic surfactants include alkyl poly(ethylene oxide), alkyl polyglucosides, nonyl phenol ethoxylate, polyoxyethylene fatty acid esters, polyoxyethylene alkyl amines, and alkylol amines.

The amount of surfactant needed will depend upon the chlorine dioxide concentration in the solution, the pH, the phosphate type and concentration, and other factors. It is within the ability of one skilled in the art to determine an optimum and a minimum necessary concentration. In some cases, combining surfactant with phosphate shows some beneficial effect to improve (reduce) corrosion from chlorine dioxide solutions than just using phosphate alone. By itself, the surfactant had little effect, but when the surfactant was combined with phosphate there was much greater positive effect than the sum of the two individual effects. The amount of surfactant used may range at about 0.50-10 wt. %, specifically 0-8 wt. %, more specifically 2-5 wt. %.

As mentioned above, the preferred method for forming the liquid mixture of the present invention involves using solid bodies. Here, particulate solid components are collectively disposed in a body, such as a unitary body, and then added to the aqueous solution. Solid bodies are discussed in commonly assigned U.S. Pat. Nos. 6,432,322 and 6,699,404 and are incorporated herein by reference.

Solid bodies, e.g. tablets, comprise a particulate metal chlorite such as sodium chlorite, a particulate acid source such as sodium bisulfate, optionally a particulate phosphate such as sodium dihydrogen phosphate, optionally a particulate source of free halogen such as the sodium salt of dichloroisocyanuric acid or a hydrate thereof, and optionally a particulate surfactant. If an acid phosphate is used as the acid source, then excess acid is required to convert the metal chlorite into chlorine dioxide and as well as to provide a separate phosphate in the mixture. Preferably the solid body is anhydrous containing less than about 1% wt. of free moisture-moisture that can be evolved at 100 degree Celsius. The solid body is suitable for producing the liquid mixture comprising chlorine dioxide with phosphate when immersed in water.

As used herein, the term "solid body" means a solid shape, preferably a porous solid shape, comprising a mixture of granular particulate ingredients wherein the size of the particles comprising the ingredients is substantially smaller than the size of the solid body. Such solid bodies may be formed by a variety of means known in the art, such as tableting, briquetting, extrusion, sintering, granulating and the like. The preferred method of forming such solid bodies is by compression, also known as tableting. For reasons of convenience, hereinafter references to tablets and tableting shall be understood to be representative of solid bodies made by any method.

In producing the solid bodies, the metal chlorite comprises an alkali or alkaline earth metal chlorite, preferably sodium chlorite, and most preferably technical grade sodium chlorite comprising nominally 80% by weight sodium chlorite and 20% by weight stabilizing salts such as sodium hydroxide, sodium carbonate, sodium chloride, sodium nitrate and/or sodium sulfate. Suitable acid sources and phosphates used within the solid bodies are similar to those mentioned above under forming composition ingredients.

Surprisingly, a very high conversion rate of the chlorite anion to chlorine dioxide is obtained by use of the tablets of the present embodiment of this invention. Thus, when the equivalent weights of tablet ingredients in powdered form are added to the same volume of water as the corresponding tablet, a much larger amount of chlorine dioxide is produced by the tablet than from the powder. Reasonable variations in stirring rate and/or water temperature have little to no effect on this surprising phenomenon.

Although not wishing to be bound by theoretical considerations, it is believed that the very high conversion rate of chlorite anion to chlorine dioxide resulting from the use of the tablets of the present embodiment of the invention occur because the tablets either contain or develop a pore structure. Such pore structure facilitates the penetration of water therein, thereby dissolving reagents into solution within the pores and producing advantageous conditions for the conversion of chlorite anion to chlorine dioxide within the pores.

It is known in the art that the rate of the reaction wherein chlorite anion is converted to chlorine dioxide under acidic conditions is of a very high order in both the concentration of chlorite anion and acidity. Increasing those concentrations dramatically increases the rate of chlorine dioxide formation.

It is believed that when water penetrates into the pore structure of the tablet, the water dissolves soluble constituents from the tablet and thereby forms a substantially saturated acidic solution of chlorite anion within the pores. Accordingly, the conversion rate of chlorite anion to chlorine dioxide is high. Nevertheless, despite the high rate of chlorine dioxide formation, a pore network must remain intact for a sufficient period of time to allow the conversion reaction to proceed to the desired degree. Once the reagents have dissolved into solution, the further conversion of chlorite anion to chlorine dioxide is very small.

The pore size and pore volume ranges required to facilitate the desired degree of conversion of chlorite anion to chlorine dioxide will depend upon many factors, e.g., the particular combination of reagents in the tablet, the size of the tablet, the shape of the tablet, the temperature of the water, other chemicals dissolved in the water, the desired degree of conversion of chlorite anion to chlorine dioxide, the desired amount of free halogen to be delivered into the solution, etc. Accordingly, it is not believed that there is a single optimum range of pore sizes or pore volumes that will produce an optimum result.

It is within the capability of one skilled in the art to vary the pore size and the pore volume of a tablet to achieve the desired result in respect to the characteristics of the chlorine dioxide solution. For example, the pore size and pore volume may be varied by varying the particle size of the powder used to prepare the tablet or by varying the compaction force used to form the tablet or by varying both the particle size and the compaction force. Larger particles of powder will generally produce larger pores and more pores in the tablet. Increasing compaction force will generally reduce both the size and volume of the pores in the tablet.

The tablets of the present embodiment of this invention have been observed to rapidly produce a highly converted solution of free molecular chlorine dioxide, meaning that the conversion ratio (chlorite anion to chlorine dioxide) is 0.25 or above. Preferably, the conversion ratio is at least 0.50, more preferably at least 0.60, and most preferably at least 0.75. The term "conversion ratio" used herein means the calculated ratio of the free chlorine dioxide concentration in the product solution to the sum of free chlorine dioxide plus chlorite ion concentrations in the product solution. Further, the chlorine dioxide solution is rapidly produced in a safe and controlled manner, and when the chlorine dioxide concentration so produced is at typical use levels (about 0.1 to about 1,000 ppm, preferably about 0.5 to about 200 ppm, by weight) in typical tap water, the solution will contain substantially no free chlorine or other free halogen and will have a generally neutral pH.

The term "rapidly produced" as used herein means that total chlorine dioxide production is obtained in less than about 8 hours, preferably in less than about 2 hours and most preferably in less than about 1 hour. The term "no free chlorine or other free halogen" used herein means that the concentration of free chlorine or other free halogen in solution is less than the concentration of chlorine dioxide in said solution on a weight basis, preferably less than ½ the concentration of chlorine dioxide in said solution, more preferably less than ¼ the concentration of chlorine dioxide, and most preferably no more than 1/10 the concentration of chlorine dioxide, on a weight basis.

The term "generally neutral pH" used herein means that the pH is higher than that normally required to form substantial concentrations of free chlorine dioxide in solution (i.e., pH higher than about 2) and lower than the pH at which chlorine dioxide is known to disproportionate in solution (i.e., pH below about 12). Preferably, the pH of the resultant solution is between about 4 and 9 to minimize the potential for corrosion of materials with which the solution comes into contact. More preferably the pH of the resultant solution should be in the range of about 5-9, and most preferably in the range of about 6-9; ideally the pH will be 7. In certain cases, it may be advantageous to produce chlorine dioxide in a solution that is already at either a higher or a lower pH than the pH of about 7. Tablets of the present embodiment of this invention may be used to deliver chlorine dioxide into such solutions without materially changing the pH of the solution when the chlorine dioxide concentration is at typical use levels. For example, if a tablet of the present embodiment of this invention is used to produce chlorine dioxide in a typical solution of laundry detergent, it is advantageous for the detergent solution to be at alkaline pH (i.e., >9) where the detergent functions best. Tablets of the present embodiment of this invention may be used for that purpose. In such cases, however, it is preferred that the pH of the resultant detergent/chlorine dioxide solution be below about 12, as chlorine dioxide degrades at a pH higher than about 12.

It is often advantageous for the free halogen concentration of the resultant solution to be low, as free halogen can lead to corrosion of materials in which the solution comes into contact, and free halogen can react with organic materials to produce toxic halogenated hydrocarbons.

In other situations, the presence of a relatively high concentration of chlorine or other free halogen in solution may be acceptable. In such situations, it is possible to use the solid bodies of the present embodiment of this invention to produce very highly converted aqueous solutions of chlorine dioxide where the ratio of the concentration of chlorine dioxide in solution to the sum of the concentrations of chlorine dioxide and chlorite anion is greater than 0.5 on a weight basis. In those cases, the concentration of chlorine or free halogen in solution may be equal to or even greater than the concentration of chlorine dioxide in solution on a weight basis. Suitable surfactants component may be employed herein as well, such surfactants may be cationic, anionic, or non-ionic.

The tablets of the present embodiment of the invention may, if desired, contain optional additional ingredients, that may be useful, for example, to assist in the tableting process, to improve the physical or aesthetic characteristics of the produced tablets and to assist tablet solubilization and/or the yield of chlorine dioxide obtained. Such ingredients include but are not limited to fillers such as attapulgite clay and sodium chloride; tableting and tablet die lubricants; stabilizers; dyes; anti-caking agents; desiccating agents such as calcium chloride and magnesium sulfate; pore forming agents such as a swelling inorganic clay, e.g., Laponite clay available from Southern Clay Products, Inc., and a framework former that can react with one or more constituents in the formulation to produce a low solubility porous framework structure in which the chlorine dioxide forming reactions may proceed.

Effervescing agents such as sodium bicarbonate may be included in small amounts, e.g., about 1 to about 50 wt. %, based on the weight of the solid body, but these effervescing agents can reduce the conversion of chlorite anion to chlorine dioxide by accelerating breakup and dissolution of the tablet.

The invention includes two general types of tablet devices. One type of device comprises tablets that are fully soluble in water, and the preferred formulation of such tablets comprises particulate powdered technical grade sodium chlorite, and a particulate powdered acid source other than dihydrogen phosphate, preferably sodium bisulfate and a particulate phosphate such as powdered phosphate salt tetra sodium pyrophosphate, tri-sodium phosphate, sodium dihydrogen phosphate, potassium dihydrogen phosphate and others known in the art. Additional phosphates may be supplied external to the tablet making the phosphate present both within and outside the tablet. As an alternative, the tablet may lack the phosphate but be formed of the chlorite and the acid. With this chlorite and acid tablet, the phosphate must be supplied external to the tablet. Additional particulate powdered ingredients may be added to the tablet such as magnesium chloride to even further improve the yield and rate of production of the chlorine dioxide. The particulate powdered ingredients are mixed and the resultant powdered mixture is compressed in a tablet die at a force sufficient to produce a substantially intact tablet, typically about 1,000-10,000 lb./in.$^2$.

The resultant tablets are stable during storage as long as the tablets are protected from exposure to water (either liquid or vapor). The tablets rapidly produce a highly converted solution of free chlorine dioxide when immersed in water.

The second type of device comprises tablets that are not fully soluble in water at a high rate. These non-fully soluble tablets are designed to have (or produce) a low solubility or slowly soluble porous framework structure in which the chlorine dioxide forming reactions may proceed to substantial completion prior to dissolution of the porous framework. Generally tablets of this second type convert a greater proportion of their chlorite anion precursor chemical to chlorine dioxide compared to the fully soluble tablets described above.

The preferred formulation for this second type of tablet device comprises particulate powdered sodium chlorite; particulate powdered sodium bisulfate; particulate powdered calcium chloride; and particulate phosphate. Additional phosphate may be supplied external to the tablet wherein the phosphate is present both within and outside the tablet. In another alternative, the tablet will lack the phosphate thus the phosphate must be supplied external to the tablet. A particulate powdered clay such as Laponite clay may optionally be added to even further improve the yield and rate of production of the chlorine dioxide. When utilized in the tablets, the clays are trapped in the pores of the framework and are not released into the bulk solution.

As with tablets of the first type, the particulate powdered ingredients are mixed and the resultant powdered mixture is compressed in a tablet die at a force sufficient to produce a substantially intact tablet, typically about 1,000-10,000 lb./in.$^2$. The resultant tablets are stable during storage as long as the tablets are protected from exposure to water (either liquid or vapor). When immersed in water, the tablets rapidly produce a highly converted solution of free chlorine dioxide.

Tablets of this second type generally provide more efficient conversion of chlorite anion to chlorine dioxide compared to tablets of the first type. It is believed that this occurs because the low solubility porous framework provides a favorable environment for the chlorine dioxide forming reactions to proceed until substantial exhaustion of the reactants.

Chlorine dioxide formation in tablets of the second type of device is believed to occur substantially within the favorable environment of the pore space of the low solubility (or slowly soluble) porous framework. Since the favorable pore structure of this framework appears to remain substantially intact during this reaction time, substantially all of the chlorite anion has an opportunity to react and form chlorine dioxide under favorable conditions within the pores. This maximizes chlorite conversion to chlorine dioxide. In contrast, a device of the first type is being dissolved into the bulk solution at the same time that it is producing chlorine dioxide. Since it is believed that the reagents will only react at a practically useful rate under concentrated conditions (such as those that exist within the pores of the tablets), that fraction of the chlorite that dissolves into bulk solution prior to conversion to chlorine dioxide will substantially remain as chlorite and not be converted to chlorine dioxide under the generally dilute conditions of the bulk solution.

The low solubility porous framework of the preferred composition of the second type of tablet device comprises a framework former such as a low solubility compound such as calcium sulfate, calcium phosphate, aluminum phosphate, magnesium phosphate, ferric sulfate, ferric phosphate or zinc phosphate; or a low solubility amorphous material such as silica-alumina gel, silica-magnesia gel, silica-zirconia gel, or silica gel; and may additionally include a clay or other substantially insoluble framework or pore former such as Laponite clay. The calcium sulfate preferably is formed from the reaction between calcium cations e.g., from the calcium chloride constituent and sulfate anions derived from the sodium bisulfate constituent. Other sources of calcium cations such as calcium nitrate as well as other sources of sulfate anions such as magnesium sulfate may also be used. Phosphate anion preferably is provided by use of soluble phosphate compounds such as sodium phosphate, sodium hydrogen phosphate, sodium dihydrogen phosphate, the corresponding potassium phosphate salts, as well as other soluble phosphate salts. The silica alumina gel preferably is formed from the reaction between sodium silicate and aluminum sulfate. Silica-magnesia gel preferably is formed from the reaction between sodium silicate and magnesium sulfate. Silica-zirconia gel preferably is formed from the reaction between sodium silicate and zirconyl sulfate. Silica gel preferably is formed from the reaction between sodium silicate and acidity from the solid acid source. Additional solid acid component may be required to compensate for the alkalinity of the sodium silicate constituent.

The preferred clay, Laponite clay, is insoluble as provided and is not released into the bulk solution. It is a swelling clay that become trapped within the pores, and enhances the pore structure of the porous framework by forming cracks and cavities as it swells. We have found that forming the low solubility porous framework, e.g., the calcium sulfate, calcium phosphate, aluminum phosphate, etc., frameworks in-situ via chemical reaction is particularly advantageous and that the chlorine dioxide yield from tablets wherein the framework is formed in-situ is significantly better (nominally 25% better) than tablets in which the framework material is a constituent of the initial powder formulation. The presence of the clay in addition to the framework material provides only a small improvement over the use of the framework material, without the clay.

The term "low solubility or slowly soluble porous framework" used herein means a porous solid structure that remains substantially undissolved in the product solution during the period of chlorine dioxide production. It is not necessary that the porous framework remain wholly intact during the reaction time to form chlorine dioxide. One aspect of this invention includes tablets of the second type in which the tablet disintegrates into substantially insoluble (or slowly soluble) granules that release chlorine dioxide into solution. This is acceptable, we believe, because the size of the granules is still large relative to the size of the pores within the pore space of the granules, so the necessary concentrated reaction conditions exist within the pore space despite the breakdown of the framework into granules. Typically, the framework former will be present in an amount of about 10 to about 90 wt. %, based on the weight of the solid body.

In tablet devices of both types, it is preferred that the powdered ingredients be dry prior to mixing and tableting in order to minimize premature chemical interaction among the tablet ingredients.

General Procedures for Making and Testing the Tablets of the Present Embodiment of This Invention Tablet Formation:

The individual chemical components of the tablet formulation are dried prior to use. The desired amount of each component is carefully weighed into a plastic vial. In the following examples, formulations are given on a weight percent basis. The vial containing all the components of the tablet formulation is shaken to mix the components thoroughly. The contents of the vial are emptied into an appropriately sized die (e.g., a 13-mm diameter for a 1 g tablet). The plunger is placed in the die and the contents are pressed into a pellet using a hydraulic laboratory press. The maximum force reading on the press gauge was 2000 pounds unless otherwise noted. This force on the tablet punch may be converted to pounds/$in.^2$ if the area of the face of the plunger in $in.^2$ is known (typically 0.206 $in.^2$ for a 1 g tablet). The resulting tablet is removed from the die and placed in a closed plastic vial until use (typically within 10 minutes).

Tablet Performance:

The tablet is placed in a volumetric flask or container filled with a known amount of tap water. Chlorine dioxide evolution starts immediately as evidenced by bubbles and the appearance of a yellow color. The tablet is allowed to react until completion. Completion of the reaction depends, in part, on the tablet type and size. Typically the reaction time is 2 hours or less if a 1 g tablet is partially insoluble and 0.5 hr. if a 1 g tablet is completely soluble. When reaction is complete, the flask/container is shaken or stirred in order to mix the contents. Then the contents are analyzed. Typically, chlorine dioxide is measured by UV-Vis spectrometry, using four wavelengths (the average value is reported). Chlorite and chlorine are measured by titration of typically 25 ml of chlorine dioxide solution using procedures equivalent to those found in the text, Standard Methods for the Examination of Water and Wastewater, $19^{th}$ Edition (1995) pages 4-57 and 4-58. This text is published jointly by the American Public Health Association, The American Water Works Association and the Water Environment Federation. The publication office is American Public Health Association, Washington, D.C. 20005. Total oxidants are measured by titration using a Brinkmann Autotitration System, 716 DMS Titrino equipped with a massive platinum electrode (Brinkmann Part No. 6.0415.100). The method is an iodimetric titration in an acid medium based on the oxidation of iodide to iodine and its subsequent reaction with the titrant, sodium thiosulfate. The typical procedure was as follows. One hundred milliliters of chlorine dioxide solution and a stirring bar were placed in a beaker and 2 g of potassium iodide (Reagent Crystals) and 10 ml of a 1N solution of sulfuric acid (Mallinckrodt) were added with stirring. The resulting solution is titrated with 0.1N thiosulfate solution (Aldrich Chemical Co.). The endpoint is automatically determined by the Brinkmann Titrino software. This endpoint is used to calculate the concentration of total oxidants in the sample. The pH of the original chlorine dioxide solution is measured using a pH electrode either on the solution "as is" and/or diluted with sufficient water to give approximately a 10 ppm concentration of chlorine dioxide.

When using the solid body having particulate sodium chlorite, at least one particulate solid acid source and particulate phosphate, the chlorine dioxide and phosphate liquid mixture is formed by immersing the solid body in water. If, however, the liquid mixture is formed using the solid body having particulate sodium chlorite, at least one particulate solid acid source, and lacking a phosphate the solid body must be immersed in an aqueous phosphate solution to produce the chlorine dioxide and phosphate liquid mixture of the present invention. Such aqueous phosphate solution may be phosphoric acid or sodium dihydrogen phosphate or by adding powdered phosphate salt to water.

Configurations other than the solid bodies discussed immediately above can be used to form the liquid mixture comprising chlorine dioxide and phosphate of the present invention. As briefly described before, the liquid mixture comprising chlorine dioxide and phosphate may be made using all aqueous solutions as well as a combination of aqueous solutions and particulates. The particulates may have different sizes and shapes and need not be disposed in a uniform body. For instance, when forming the liquid mixture using all aqueous solutions, an aqueous sodium chlorite solution may be mixed with a phosphoric acid solution. Another method for forming the liquid mixture uses a combination of aqueous solutions and particulates that are not disposed in a solid body, wherein at least one of the metal chlorite, the acid and the phosphate will be in particulate form.

Another method for producing the liquid mixture comprising chlorine dioxide and phosphate includes using a membrane device. The device is an enclosure that is comprised at least in part by a membrane. Dry chlorine dioxide generating components, such those particulate chlorine dioxide generating components listed above, are disposed and held in the enclosed space of the membrane device. The membrane device is then contacted with water to produce the aqueous chlorine dioxide solution.

The membrane device is water permeable allowing the water into the device to react with the chlorine dioxide generating components. The membrane also permits chlorine dioxide to pass out of the device to form the liquid mixture comprising chlorine dioxide. A full discussion of the membrane device is disclosed in U.S. Pat. No. 6,238,643 and is incorporated by reference herein.

Preparing the chlorine dioxide liquid mixture using the solid body or the membrane device allows for the precise control of the concentration, strength and rate of release of chlorine dioxide.

Chlorine dioxide has established uses in bleaching textiles and pulp in making paper, deodorizing, disinfecting, cleaning, sanitizing and sterilizing surfaces or spaces. The present invention can further be used in wound dressings, environmental cleanup, dental/oral care substances, germ killing material, tooth whitening compositions, and personal lubricants among a variety of other applications.

The ingredients of the liquid mixture comprising chlorine dioxide impart different attributes to the overall mixture. For instance, if the surfactant is a quaternary ammonium compound biocidal activity will be present in the mixture. Surfactant quats, unreacted halogens and chlorine dioxide provide antimicrobial activity to the mixture. Also, surfactants are useful for removing organic soil, which in combination with phosphates can result in reduction of corrosion potential. The phosphate not only reduces the corrosivity of the solution with respect to use on metal surfaces, but also provides cleaning and chelating capacity to the solution. Use of excess acid will help in removing mineral scale from surfaces.

The following examples demonstrate the invention above.

EXAMPLE 1

Tablet formulations were made according to the tables below. Table 1 displays ingredients for a tablet composed of a metal chlorite such as sodium chlorite, a halogen such as sodium salt of dichloroisocyanuric acid, an acid other than hydrogen phosphate being sodium acid sulfate and a phosphate being sodium dihydrogen phosphate. A second tablet composed of a metal chlorite, an acid and a phosphate is disclosed in Table 3.

In both cases, the tablets were prepared using specific desired amount of each ingredient as follows: anhydrous sodium dihydrogen phosphate (>99.0% NaH2PO4) obtained from Sigma-Aldrich Chemical Co., of St. Louis, Mo. was dried at 90 degrees C. It was subsequently determined that drying at 180 degrees C. resulted in improved stability of tablets prior to immersion in water. Other ingredients were dried as described in U.S. Pat. No. 6,699,404. The desired amount of each ingredient was weighed and the ingredients were mixed and pressed into a tablet, and solutions were prepared as described in the above-referenced patent.

The tablet formulations in tables 1 and 3 were tested and data was compiled as to the chlorine dioxide yield, chlorite anion ($ClO_2^-$) yield, free oxidant content presence of chlorine and pH level and is displayed in tables 2 and 4, respectively. The resultant solutions were analyzed by potassium iodide/sodium thiosulfate titration following the method given in the "Standard Methods for the Examination of Water and Wastewater", 19th Ed., 1995, pgs. 4-57 and 4-58, except that the titration was done to a starch indicator endpoint instead of amperometrically.

Generally the metal chlorite is present in the tablets in an amount of about 0.10-40 wt. %, specifically 0.5-30 wt. %, more specifically 15-30 wt. %; acids in an amount of about 35-80 wt. %, specifically 47.50-75 wt. %, more specifically 50-60 wt. %; halogens in the range of about 0.50-10 wt. %, specifically 0-8 wt. %, more specifically 2-5 wt. %; and phosphates in an amount of about 10-60 wt. %, more preferably from 20-50 wt. %. In the resultant mixture, the phosphate is present in an effective amount to promote cleaning being in a range of about 0.1% to 95%, more preferably in a range of about 15% to 95%. Alternatively, the phosphate is present in an effective amount to reduce the corrosivity of the solution. The phosphate is present in the range of about 0.1 ppm to 10%, more preferably in the range of about 1 ppm to 1%.

TABLE 1

| Tablet | Component 1 A: $NaClO_2$ % | Component 2 B: NaDCCA % | Component 3 C: $NaHSO_4$ % | Component 4 D: $NaH_2PO_4$ % |
|---|---|---|---|---|
| 1 | 18.33 | 0.00 | 56.67 | 25.00 |
| 2 | 5.00 | 0.00 | 50.00 | 45.00 |
| 3 | 17.50 | 0.00 | 50.00 | 32.50 |
| 4 | 10.00 | 3.33 | 48.33 | 38.33 |
| 5 | 20.00 | 0.00 | 60.00 | 20.00 |
| 6 | 10.00 | 3.33 | 60.00 | 26.67 |
| 7 | 15.00 | 0.00 | 55.00 | 30.00 |
| 8 | 14.67 | 4.89 | 56.00 | 24.44 |
| 9 | 17.50 | 0.00 | 50.00 | 32.50 |
| 10 | 30.00 | 0.00 | 50.00 | 20.00 |
| 11 | 19.50 | 6.50 | 47.50 | 26.50 |
| 12 | 15.00 | 5.00 | 60.00 | 20.00 |
| 13 | 5.00 | 1.67 | 54.58 | 38.75 |
| 14 | 5.00 | 0.00 | 50.00 | 45.00 |
| 15 | 10.00 | 0.00 | 56.67 | 33.33 |
| 16 | 24.50 | 8.00 | 47.50 | 20.00 |
| 17 | 15.00 | 5.00 | 60.00 | 20.00 |
| 18 | 30.00 | 0.00 | 50.00 | 20.00 |
| 19 | 5.00 | 0.00 | 60.00 | 35.00 |
| 20 | 21.00 | 7.00 | 51.83 | 20.17 |
| 21 | 27.50 | 5.00 | 47.50 | 20.00 |
| 22 | 15.00 | 5.00 | 47.50 | 32.50 |
| 23 | 27.50 | 5.00 | 47.50 | 20.00 |
| 24 | 25.00 | 0.00 | 55.00 | 20.00 |

TABLE 2

| Tablet | Response 1 $ClO_2$ Yield % | Response 2 $ClO_2^-$-Yield % | Response 3 Free Oxidant % | Response 4 Chlorine % | Response 5 pH |
|---|---|---|---|---|---|
| 1 | 2.72 | 1.41 | 2.79 | 0.039 | 2.97 |
| 2 | 0.65 | 0.26 | 0.84 | 0.101 | 3.08 |
| 3 | 2.56 | 3.04 | 2.97 | 0.212 | 3.19 |
| 4 | 0.18 | 0.02 | 1.9 | 0.895 | 2.85 |
| 5 | 2.4 | 7.06 | 2.61 | 0.108 | 3.04 |
| 6 | 2.16 | 0.34 | 4.96 | 1.452 | 2.99 |
| 7 | 1.87 | 1.93 | 2.18 | 0.163 | 3.08 |
| 8 | 3.61 | 0.86 | 5.99 | 1.231 | 3 |
| 9 | 1.39 | 6.71 | 1.63 | 0.125 | 3.03 |
| 10 | 1.9 | 11.73 | 2.39 | 0.253 | 3 |
| 11 | 5.26 | 1.45 | 9.77 | 2.338 | 3.48 |
| 12 | 3.6 | 0.3 | 8.12 | 2.346 | 2.92 |
| 13 | 1.07 | 0.02 | 2.24 | 0.609 | 2.95 |
| 14 | 0.43 | 0.16 | 0.45 | 0.013 | 2.93 |
| 15 | 0.99 | 0.93 | 1.6 | 0.32 | 2.81 |
| 16 | 8.99 | 1.28 | 11.28 | 1.186 | 3.83 |
| 17 | 3.39 | 0.64 | 6.23 | 1.473 | 2.74 |
| 18 | 2.29 | 10.82 | 2.41 | 0.063 | 3.45 |
| 19 | 0.69 | 0.05 | 0.47 | −0.116 | 2.93 |
| 20 | 8.71 | 0.28 | 9.56 | 0.441 | 3.78 |
| 21 | 7.42 | 5.79 | 7.29 | −0.069 | 3.45 |
| 22 | 3.75 | 0.08 | 8.32 | 2.372 | 3.36 |
| 23 | 8.48 | 2.59 | 8.85 | 0.192 | 4.58 |
| 24 | 2.06 | 9.66 | 1.26 | −0.415 | 3.2 |

TABLE 3

| Tablet | Component 1 A: NaClO2 | Component 2 B: NaHSO4 | Component 3 C: NaH2PO4 |
|---|---|---|---|
| 1 | 5.00 | 62.50 | 32.50 |
| 2 | 5.00 | 50.00 | 45.00 |
| 3 | 0.10 | 75.00 | 24.90 |
| 4 | 5.00 | 75.00 | 20.00 |
| 5 | 0.10 | 50.90 | 49.00 |
| 6 | 0.40 | 58.63 | 40.97 |
| 7 | 2.55 | 75.00 | 22.45 |
| 8 | 0.10 | 62.95 | 36.95 |
| 9 | 5.00 | 50.00 | 45.00 |
| 10 | 1.17 | 67.59 | 31.24 |
| 11 | 5.00 | 62.50 | 32.50 |
| 12 | 0.10 | 50.90 | 49.00 |
| 13 | 1.17 | 55.54 | 43.29 |
| 14 | 5.00 | 75.00 | 20.00 |
| 15 | 3.67 | 58.33 | 38.00 |

TABLE 4

| Run | Response 1 ClO2 Yield % | Response 2 ClO2- Yield % | Response 3 Free Oxidant % | Response 4 Chlorine % | Response 5 pH % |
|---|---|---|---|---|---|
| 1 | 0.64 | 0.18 | 0.67 | 0.014 | 2.97 |
| 2 | 0.56 | 0.06 | 0.58 | 0.012 | 3.1 |
| 3 | 0.02 | 0.01 | 0.02 | 0.003 | 2.72 |
| 4 | 0.44 | 0.18 | 0.64 | 0.103 | 2.66 |
| 5 | 0.05 | 0.01 | 0.06 | 0.007 | 2.99 |
| 6 | 0.05 | 0.01 | 0.07 | 0.014 | 2.85 |
| 7 | 0.33 | 0.03 | 0.38 | 0.025 | 2.73 |
| 8 | 0.04 | 0.003 | 0.07 | 0.017 | 2.78 |
| 9 | 0.73 | 0.16 | 0.81 | 0.044 | 3.16 |
| 10 | 0.19 | 0.02 | 0.21 | 0.01 | 2.76 |
| 11 | 0.57 | 0.22 | 0.75 | 0.089 | 2.85 |
| 12 | 0.03 | 0.01 | 0.06 | 0.015 | 3.00 |
| 13 | 0.14 | 0.02 | 0.15 | 0.006 | 2.94 |
| 14 | 0.67 | 0.03 | 0.71 | 0.02 | 2.70 |
| 15 | 0.38 | 0.11 | 0.41 | 0.016 | 2.89 |

EXAMPLE 2

Four sets of solutions were prepared by dissolving a single 1.5 gram size tablet of the formulation of Example 5 of U.S. Pat. No. 6,699,404 in 600 ml of deionized water. To each solution 210 mg of sodium bicarbonate ($NaHCO_3$) was added. 379 mg and 758 mg of sodium dihydrogen phosphate ($NaH_2PO_4$) were added to the third and fourth solutions, respectively. The third and fourth solutions yielded nominally 500 ppm and 1000 ppm phosphate, respectively.

A corrosion analysis was conducted using test coupons of type 304 stainless steel obtained from Metal Samples Co., Munford, Ala. The corrosiveness of each solution was measured by determining the electrochemical potential necessary to initiate corrosion on each test coupon. The test coupons were attached to a variable DC voltage supply and immersed in the test solutions. A platinum electrode was used for counter electrode. The voltage between the electrodes was slowly increased until the onset of electrical flow. New 304 stainless steel test coupons were used for every test. The voltage at which current flow began is termed "corrosion potential." A high corrosion potential represents reduced corrosiveness in the test solution.

Figure 1:
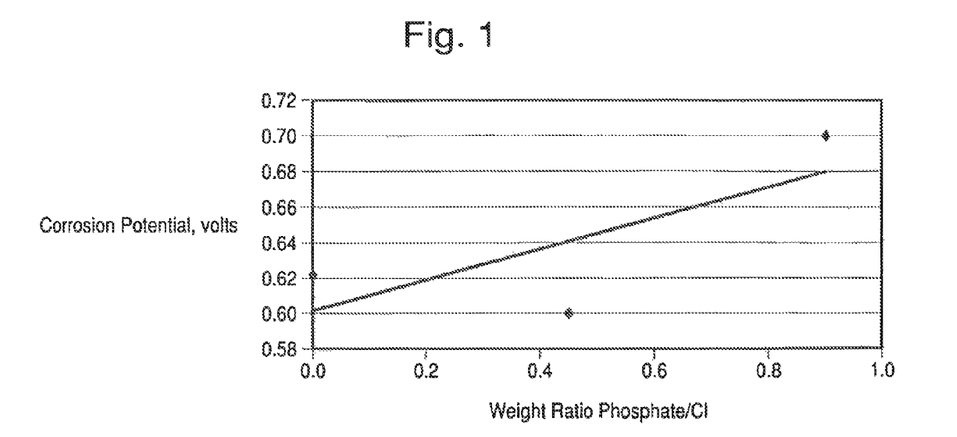
FIG. 1 is a graph of data showing the average corrosion potential for phosphate concentrations versus the weight ratio of phosphate to chlorine species in solutions.

Table 5 shows the results of the test, showing the average corrosion potential for each phosphate concentration versus the weight ratio of phosphate to chlorine species in the solution. Table 5 is graphed in FIG. 1 and it shows that as the ratio of phosphate to chlorine species increases, the corrosion potential (i.e., less corrosiveness) also increases. Thus, an effective amount of phosphate is used to reduce the corrosivity of the resultant liquid mixture, which consequentially inhibits metal corrosion when applied to metal surfaces. In particular, the corrosion potential improved when the amount of phosphate to chlorine species ratio rose above 0.4.

TABLE 5

| | Corrosion Potential |
|---|---|
| Weight Ratio Phosphate/Chlorine | Corrosion Potential (Volts) |
| 0.0 | 0.602 |
| 0.2 | 0.620 |
| 0.4 | 0.638 |
| 0.6 | 0.645 |
| 0.8 | 0.670 |

EXAMPLE 3

Figure 2:
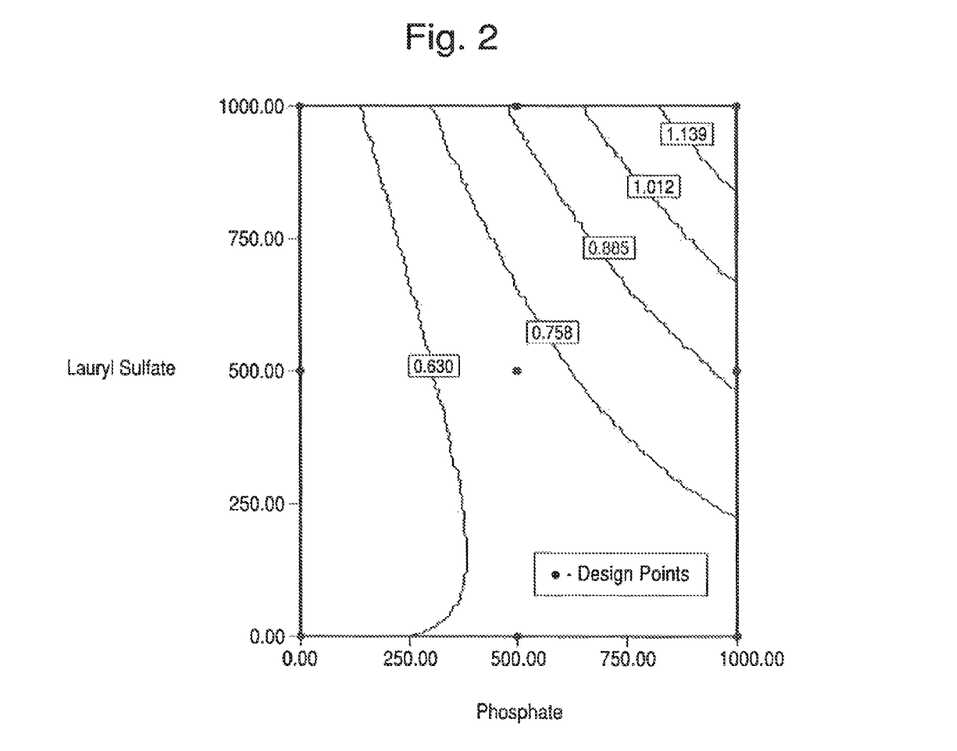
FIG. 2 is a graph of corrosion potential relative to differing amounts of phosphate and lauryl sulfate surfactant.

Different concentrations of phosphate and lauryl sulfate were added to 200 ppm chlorine dioxide solution and corrosion potentials were measured as in Example 2. The data was fitted to a regression equation using a least squares method and FIG. 2 shows the corrosion potentials from that regression equation displayed as contour lines on a graph of the different concentrations of phosphate and lauryl sulfate in the chlorine dioxide solution. According to FIG. 2, lauryl sulfate had little beneficial effect (i.e., no change in corrosion potential), the surfactant, by itself, had little effect and phosphate alone increased corrosion potential from about 0.6 to about 0.7 volts. However, when the surfactant was combined with phosphate there was much greater positive effect than the sum of the two individual effects. The combination of 1000 ppm lauryl sulfate and 1000 ppm phosphate increased corrosion potential to about 1.2 volts, which is close to the corrosion potential of water.

As stated above, the amount of surfactant needed will depend upon the chlorine dioxide concentration in the solution, the pH, the phosphate type and concentration, and other factors. One of skill in the art could be able to determine an optimum and a minimum necessary concentration of surfactant.

EXAMPLE 4

Tablets were prepared using powdered ingredients dried as shown in Table 5. Specific weights of each dried ingredient as shown in Table 6 were combined in an amber glass jar, the jar was sealed and the powders were mixed by rolling for 1 hour. Tablets were pressed from the powder by placing nominally 1 gram of powder into a 13 mm diameter stainless steel die and compacting the powder with a force of 2000 lb using a hydraulic press.

A tablet weighing 1.06 grams was placed into 1 liter of potable tap water and allowed to react without stirring until fully dissolved. The resultant solution was mixed and analyzed for chlorine dioxide concentration using a Hach DR2010 UV/Visible spectrometer (Hach Company, Loveland Colo.) following the procedure of Hach test method 8138. The concentration was 85 mg/liter.

TABLE 5

| Ingredient | Drying temperature, °C. | Drying Time |
| --- | --- | --- |
| Technical grade (80%) sodium chlorite | 110 | Overnight |
| Anhydrous magnesium sulfate | 300 | Overnight |
| Anhydrous sodium dihydrogenphosphate | 180 | Overnight |
| NaDCCA dihydrate | 130 | Overnight |
| Anhydrous sodium acid sulfate | 50/85 | Overnight/4 hr |

TABLE 6

| Ingredient | Weight, gm |
| --- | --- |
| Technical grade (80%) sodium chlorite | 52 |
| Anhydrous magnesium sulfate | 42 |
| Anhydrous sodium dihydrogen phosphate | 40 |
| NaDCCA | 14 |
| Anhydrous sodium acid sulfate | 52 |

What is claimed is:

1. A solid chlorine dioxide forming mixture used to produce a chlorine dioxide liquid mixture, the forming mixture comprising:
    (i) about 15 to 30 wt. % solid metal chlorite;
    (ii) 26 to about 60 wt. % acid source other than an acid phosphate;
    (iii) about 20 to 50 wt. % sodium dihydrogen phosphate;
    (iv) about 0.5 to 8 wt. % free halogen source; and
    (v) optionally magnesium sulfate;
wherein:
    the mixture is in the form of a solid body;
    the solid body is fully soluble in water; and
    the metal chlorite and the acid source react to form 0.1 to 1,000 ppm chlorine dioxide in water and form the chlorine dioxide liquid mixture.

2. The chlorine dioxide forming mixture of claim 1, wherein the metal chlorite is sodium chlorite.

3. The chlorine dioxide forming mixture of claim 1, wherein the acid source is sodium acid sulfate.

4. The chlorine dioxide forming mixture of claim 1, wherein the free halogen is sodium salt of dichloroisocyanuric acid and/or the dihydrate thereof.

5. The chlorine dioxide forming mixture of claim 1, wherein the forming mixture when added to water results in a chlorine dioxide liquid mixture having a pH above 2.5 and below 12.

6. The chlorine dioxide forming mixture of claim 1, wherein the forming mixture does not comprise a source of calcium cations.

7. The chlorine dioxide forming mixture of claim 1, wherein the metal chlorite is sodium chlorite; the free halogen is sodium salt of dichloroisocyanuric acid and/or the dihydrate thereof; and wherein magnesium sulfate is present.

8. The chlorine dioxide forming mixture of claim 7, comprising:
    (i) about 26 wt. % solid sodium chlorite;
    (ii) 26 wt. % sodium acid sulfate;
    (iii) about 20 wt. % sodium dihydrogen phosphate;
    (iv) about 7 wt. % sodium salt of dichloroisocyanuric acid and/or the dihydrate thereof; and
    (v) 21 wt. % magnesium sulfate.

9. A method of cleaning and sanitizing a metal object comprising:
    mixing the solid chlorine dioxide forming mixture of claim 1 and water, thereby producing a chlorine dioxide liquid mixture comprising 0.1 to 1,000 ppm chlorine dioxide and 1 ppm to 100,000 ppm phosphate, and contacting said metal object with the liquid mixture.

10. The method of claim 9, wherein the chlorine dioxide liquid mixture has a pH above 2.5 and below 12.

11. The method of claim 9, wherein the chlorine dioxide liquid mixture has a chlorine dioxide concentration of about 85 to 1,000 ppm.

12. The method of claim 9, wherein the forming mixture does not comprise a source of calcium cations.

13. The method of claim 9, wherein the metal chlorite of the forming mixture is sodium chlorite; the free halogen of the forming mixture is sodium salt of dichloroisocyanuric acid and/or the dihydrate thereof; and wherein magnesium sulfate is present in the forming mixture.

14. The method of claim 12, wherein the forming mixture comprises:
    (i) about 26 wt. % solid sodium chlorite;
    (ii) 26 wt. sodium acid sulfate;
    (iii) about 20 wt. % sodium dihydrogen phosphate;
    (iv) about 7 wt. % sodium salt of dichlorolsoryanuric acid and/or the dihydrate thereof; and
    (v) 21 wt. % magnesium sulfate.

15. A method of preparing a chlorine dioxide liquid mixture, the method comprising mixing the solid chlorine dioxide forming mixture of claim 1 and water, thereby producing a chlorine dioxide liquid mixture comprising 0.1 to 1,000 ppm chlorine dioxide and 1 ppm to 100,000 ppm phosphate.

16. The method of claim 15, wherein the chlorine dioxide liquid mixture has a pH above 2.5 and below 12.

17. The method of claim 15, wherein the chlorine dioxide liquid mixture has a chlorine dioxide concentration of about 85 to 1,000 ppm.

18. The method of claim 15, wherein the forming mixture does not comprise a source of calcium cations.

19. The method of claim 15, wherein the metal chlorite of the forming mixture is sodium chlorite; the free halogen of the forming mixture is sodium salt of dichioroisocyanuric acid and/or the dihydrate thereof; and wherein magnesium sulfate is present in the forming mixture.

20. The method of claim 19, wherein the forming mixture comprises:
    (i) about 26 wt. % solid sodium chlorite;
    (ii) 26 wt. % sodium acid sulfate;
    (iii) about 20 wt. % sodium dihydrogen phosphate;
    (iv) about 7 wt. % sodium salt of dichloroisocyanuric acid and/or the dihydrate thereof; and
    (v) 21 wt. % magnesium sulfate.

* * * * *